Oct. 12, 1965
T. J. NAJAR
3,210,803
PLASTIC TUBING EXTRUSION DIE AIR RING
Filed Nov. 12, 1963
3 Sheets-Sheet 1
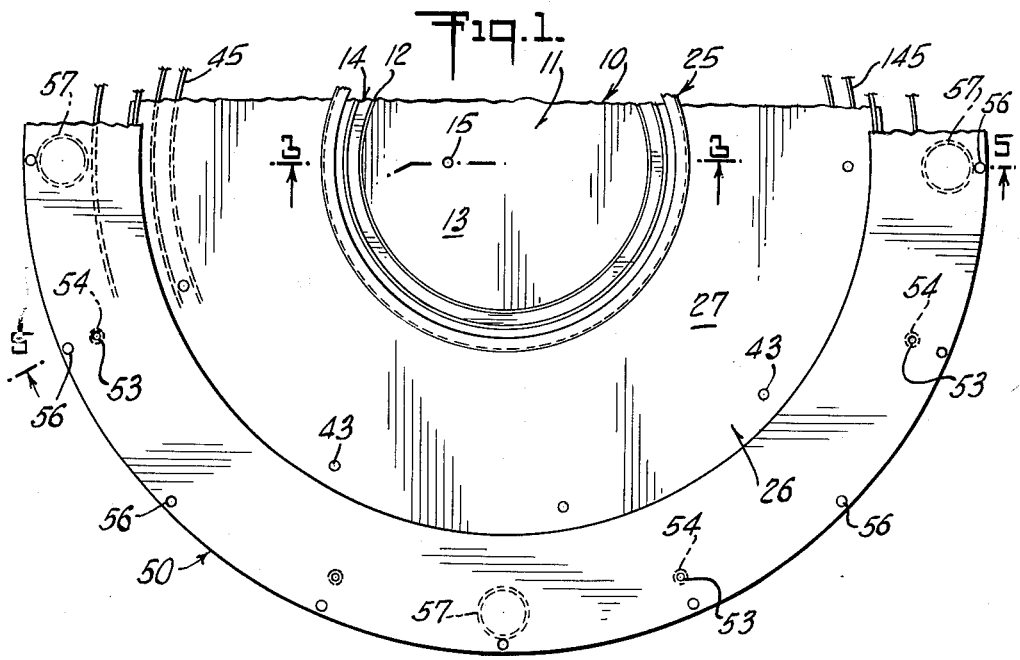
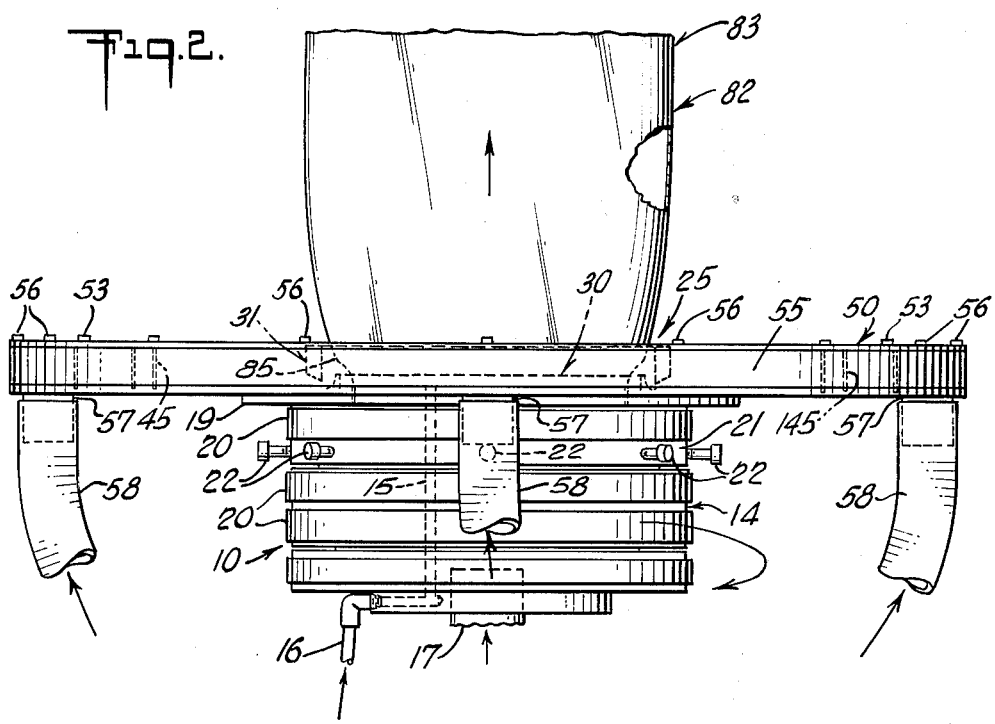

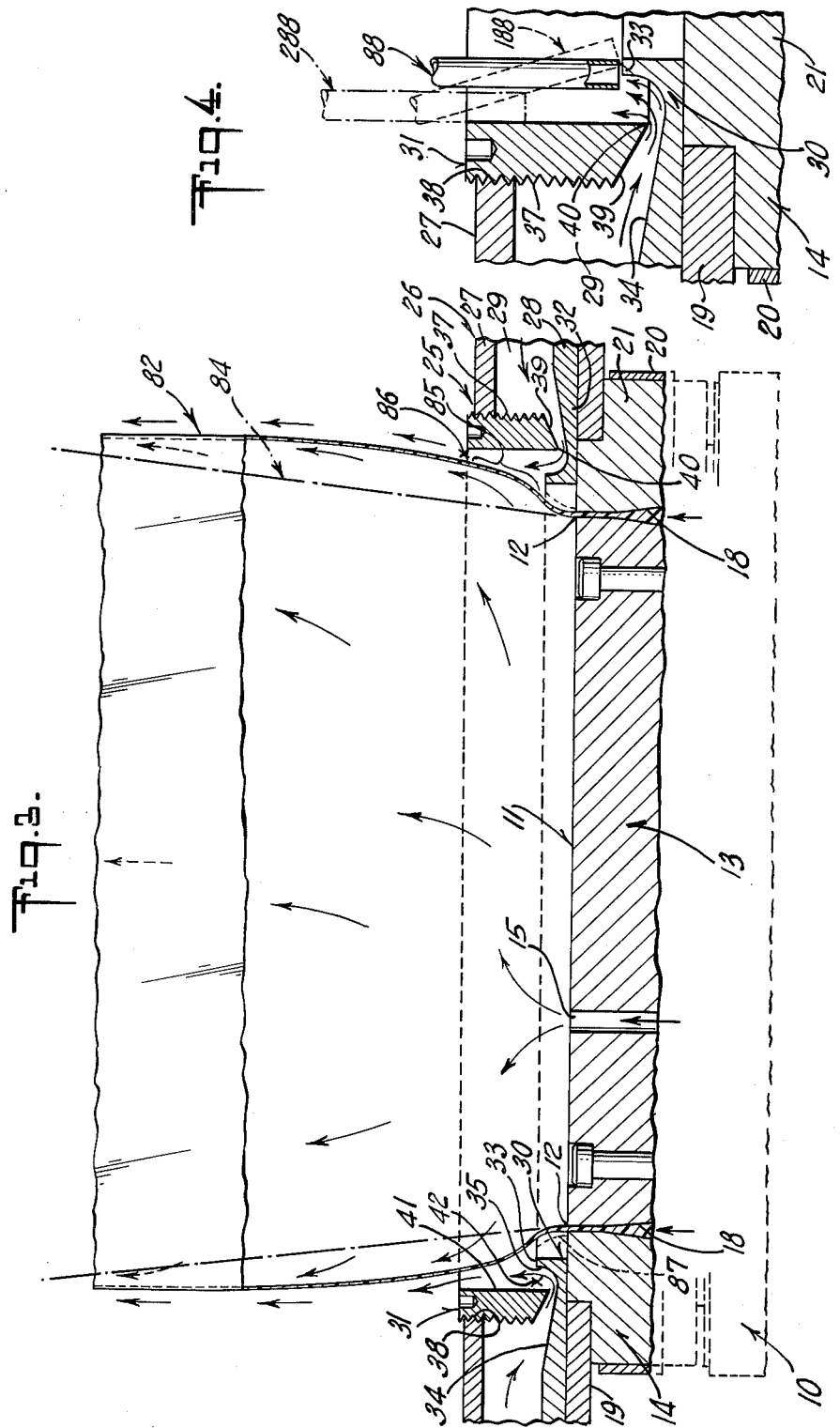

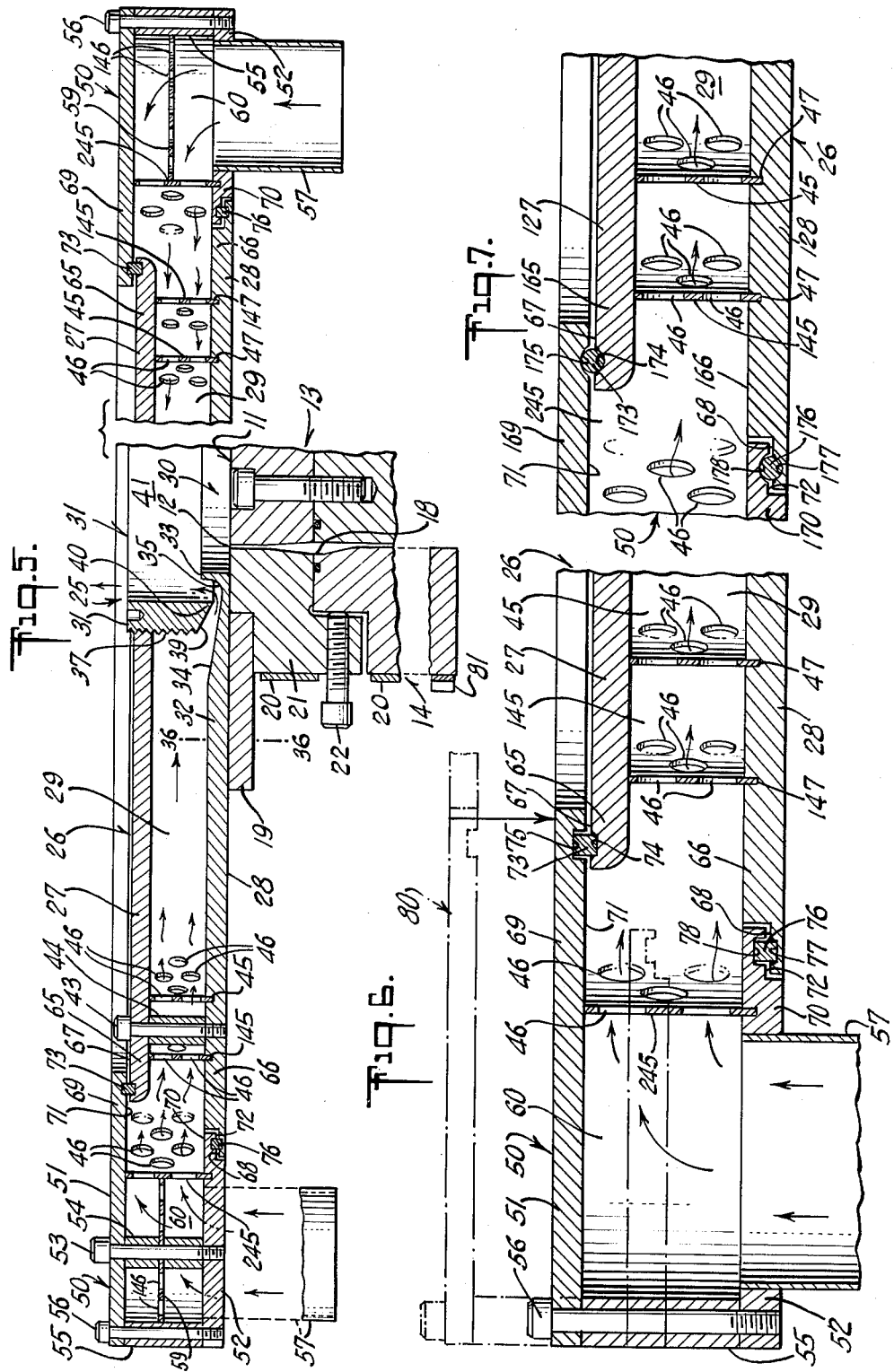

United States Patent Office 3,210,803
Patented Oct. 12, 1965

3,210,803
PLASTIC TUBING EXTRUSION DIE AIR RING
Thomas J. Najar, Wyckoff, N.J., assignor to Poly Plastic Products, Inc., Oakland, N.J., a corporation of New Jersey
Filed Nov. 12, 1963, Ser. No. 322,901
10 Claims. (Cl. 18—14)

The present invention relates to extrusion die assemblies for extruding continuous plastic tubing from melts of thermoplastic materials, such as polyethylene, polypropylene, vinyl compositions and other thermoplastics, and more particularly, to exterior air supplying ring nozzle structure thereof and cooling air supply means for the latter.

Extrusion dies for this purpose are known and such may be used in conventional form in the practice of the present invention. Such a die has a delivery end provided with an annular extruding orifice defined between substantially coaxially arranged core means and surrounding die ring structure. Dies of this type usually have the surrounding die ring structure enveloped by heating rings to assure that the melt is maintained at proper extruding temperature in passing through the die. It is common practice to equip such dies with means slowly to oscillate them back and forth about their axes or to rotate them, e.g., at about one-eighth revolution per minute (⅛ rev./min.). Such slow oscillation or rotation is for the purpose of distributing about the circumferential surface of plastic tubing extruded therefrom any small imperfections which may result from minute surface inaccuracies in the extruding orifices.

The die core of such a die usually is equipped with an air supply duct to deliver a quantity of air to the interior of the extruded plastic tubing in starting the extruding operation of the die to maintain the extruded tubing in cylindrical form until it is chilled or set, which is usually attained after expansion to desired diameter, and the chilled tubing then is progressively pinched between flattening roller equipment which may include gusset forming shoes or blades. Since the quantity of air initially supplied by such core supply duct is trapped therewithin by the pinch off at the flattening roller equipment it is common practice to shut off the interior air supplied therethrough after a run from a die is started, although there may be some leakage during continued production, such as may occur through gussets, which requires minor replacement. It is the pressure of the trapped interior air which determines the amount of expansion to desired diameter and attendant adjustment of wall thickness of the soft extruded plastic tubing before chilling or setting.

The strength of such extruded tubing with respect to longitudinal tearing or ripping is dependent upon stabilization of the crystalline structure thereof before chilling or setting. The reorientation of the crystalline structure which constitutes the stabilization must be performed as quickly as possible after extrusion, as must the cooling to the chill point, to obtain a reasonable rate of production. Prior to the present invention the gradual stretching of the extruded tubing to expanded size was relied upon to attain the stabilization. Cooling to the chill point was attained by directing cooling air annularly to the exterior of the plastic tubing as it was extruded, but speed of cooling is related to the wall thickness of the tubing (the thinner the tubing wall the more rapid is the cooling effect) and when the tubing wall thickness is only gradually reduced by relatively slow progressive stretching the rate or speed of production is limited by these factors.

It is an object of the present invention to provide in such extrusion equipment means to speed up the stabilization and cooling to the chill point, thereby greatly increasing in an efficient manner the rate of production of such extruded plastic tubing. This desirable end is attained by providing unique exterior cooling air supplying annular nozzle structure located at the extrusion orifice which so directs the flow of cooling air annularly against the hot plastic tubing as it issues therefrom as to cause it immediately to pop out into a stretched bubble or to balloon or bell out appreciably toward the ultimate expanded size in which it is then chilled, and tremendously to speed the chilling thereby.

It is another object of the present invention to provide such exterior cooling air supplying annular nozzle structure so mounted to an extrusion die of the described type as to cause the cooling air to be emitted from the mouth of the nozzle generally parallel to the die axis for longitudinal flow outward along the hot extruded plastic tubing as it is rapidly drawn upwardly from the die orifice there to create annularly about the tubing at this point a negative pressure so as to cause the desired stabilizing ballooning or belling effect with immediate thinning of the tubing wall attendant thereon.

For this purpose the die assembly of the present invention includes in combination with such a die structure of a unique, annular, exterior air supplying, ring nozzle arranged coaxially about and appreciably spaced radially outward of the annular die orifice. This nozzle structure is provided in the form of a pair of spaced, coaxially arranged and cooperative inner and outer ring jaws having opposed and spaced-apart annular air flow guiding surfaces together defining therebetween an annular delivery mouth. These ring jaws and their opposed flow guiding surfaces are so shaped as to direct an annular flow of cooling air through the nozzle mouth axially outward from the extrusion end of the die generally parallel to the axis of the latter and along the outer surface of the hot plastic tubing being extruded from the die orifice. Annular air-sealing means are provided which extend between the inner ring jaw and the orifice to block off the inner end of the space about the issuing plastic tubing within the nozzle structure. The outer ring jaw has an inside annular surface opposed to the axis of the die beyond the extrusion end of the latter and the nozzle mouth, with this inside surface being spaced appreciably radially outward of the orifice whereby air flow from the nozzle mouth is directed axially outward along this inside jaw surface through the annular space between the latter and the outer surface of the issuing plastic tubing to create in this space partial evacuation for substantially immediate attainment of the belling or ballooning effect.

It is a further object of the present invention to provide efficient means for supplying cooling air to exterior nozzle structure which will permit the latter to oscillate or rotate with the rotary die, such as may result from being carried thereby, with the air supply means being equipped with unique air-sealing joint means that allows such rotary motion of the nozzle structure while being supplied with the cooling air from a relatively fixed annular manifold. In order to attain this desired end the assembly of the present invention is provided with a pair of axially-spaced, laterally flat, annular, washer-like plate means coaxially arranged about the nozzle ring jaws with each of the latter connected to one of the former in a substantially air-tight manner to define an annular hollow head for annular supply of cooling air therethrough to the delivery mouth of the nozzle. Each of these washer-like means has a circumferential marginal zone defining an annular flange having an upwardly-facing support face with the resulting pair of top and bottom support faces being rotatable with the die and air ring nozzle. The air supplying annular manifold is a relatively non-rotary structure which coaxially surrounds the die, the nozzle, the washer-like means and the marginal support faces of the latter. This manifold has a pair of axially-spaced, lateral top and bottom annular flanges extending radially inward from the inner side thereof with the interior of the manifold communicated annularly to the space between these flanges. The manifold flanges include inner edge zones having downwardly-facing surfaces serving as a pair of top and bottom support faces and providing with the head support flanges top and bottom pairs of opposed and lapped flange faces. Each of these pairs of opposed and lapped flange faces is provided with a circular bearing ring of certain cross-sectional shape which is interposed between the paired lapped flange faces and with this bearing ring being carried in a substantially air-tight manner by one of the lapped flange faces. The other lapped flange face of the latter has a circular track therein of a transverse shape complementary to the transverse shape of the adjacent portion of this bearing ring and with the latter nested in this track for rotary slide therein while maintaining a substantially air-tight seal thereat. Thus the relatively non-rotary air supply manifold is supported upon the washer-like plate means which are carried by the nozzle structure and between which the manifold is delivered to the annular nozzle mouth while permitting the washer-like plate means and the nozzle structure to oscillate or rotate with the die without undue leakage of cooling air at the joints provided by such flange and bearing ring sub-assemblies.

Still another object of the invention is to provide structural embodiments of the apparatus which may be readily constructed in an economical manner and which allow efficient use and operation thereof.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a top plan view to considerably reduced scale, with parts broken away, of a die assembly of the present invention;

FIG. 2 is a side elevational view, with parts broken away, of the die assembly illustrated in FIG. 1, showing in the operation thereof the issuing plastic tubing (with parts of the latter broken away) continuously extruded from the die orifice during an operational run;

FIG. 3 is an enlarged transverse sectional view, taken substantially on line 3—3 of FIG. 1, with parts broken away and others indicated in dotted lines, illustrating the extrusion operation depicted in FIG. 2 and the attendant flow of cooling air emitting from the surrounding air ring nozzle;

FIG. 4 is an enlarged sectional detail of a portion of the ring jaws of the cooling air supply nozzle shown in FIG. 3, illustrating three different positions of the Pitot tube of a Dwyer #460 air meter employed to measure the pressure of the emitted cooling air at three different points;

FIG. 5 is an enlarged sectinal view taken substantially on line 5—5 of FIG. 1, with parts broken away, illustrating paths of flow of exterior cooling air supplied by way of the mainfold and the nozzle structure;

FIG. 6 is an enlarged transverse sectional view of a portion of the structure shown in FIG. 5, illustrating the structural details of the rotary joints in the coling air supply equipment, and indicating in dot-dash lines the simplicity of the mounting of the relatively non-rotary manifold upon the rotatable air supply means leading to the nozzle structure, with bearing rings of certain cross-sectional shape depicted therein; and FIG. 7 is a transverse sectional view similar to a portion of the showing in FIG. 6, with parts broken away, illustrating bearing rings of a different cross-sectional shape.

Referring to the drawings, in which like numerals identify similar parts throughout, it will be seen from FIGS. 1 to 3 incl. that an embodiment of a die assembly of the present invention includes a die 10 having an extrusion end 11 provided with an annular extruding orifice 12 defined between substantially coaxially arranged cylindrical core means 13 and surrounding die ring structure 14. The parts of the die 10 may be formed from any suitable heat resistant material, such as steel, aluminum compound, copper compositions of brass and bronze types, etc.

The cylindrical die core 13 is provided with a duct or passage 15 to supply air interiorly of plastic tubing extruded from the annular orifice 12. As will be seen from FIG. 2, the interior air supply duct 15 is suitably connected to a source of forced air, such as by conventional piping 16, which may include a flexible section of hose to permit oscillation or rotation of the die 10, and which may be equipped with a suitable manually-operated valve (not shown). Conventionally, a feed duct 17 guides flow of plastic melt to the interior of the die 10 which is suitably equipped to distribute it uniformly to an annular feed pasage 18, illustrated in FIG. 3, leading to the extruding orifice 12.

It is indicated in FIGS. 2 and 3 that the die ring structure 14 carries a washer-like plate ring 19 on its top end for support of exterior air supplying nozzle structure. The outer die ring structure 14 also is conventionally equipped with a plurality of heating rings 20 to maintain the temperature of the plastic melt flowing up through the die 10. The surrounding die ring structure 14 conventionally may include a top ring section 21 carrying a plurality of set screws 22 with which the former may be adjusted coaxially with respect to the core 11 for attaining true concentricity to assure that the annular extruding orifice 12 is of uniform width at all points. Details of these structural features are not shown since they are well understood in the art and may vary in accordance with the practices and specifications of various die manufacturers.

In accordance with the present invention the extruding die 10 is equipped with an unique, annular, exterior air supplying ring nozzle structure or sub-assembly 25. The nozzle sub-assembly 25 includes an annular hollow head 26 which, as may be best seen in FIG. 5, may include a pair of opposed and axially-spaced, lateral top and bottom circumambient walls 27 and 28 that extend radially outward from the exterior air supplying annular nozzle proper, and which provide therebetween an annular flow passage 29 leading to the latter. For this purpose the bottom circumambient walls 27 and 28 of the hollow head 26 may be in the form of laterally flat, annular, washer-like plate means to the inner edges of which the opposed ring jaws of the nozzle are connected or mounted in substantially air-tight manner. The parts of the ring nozzle sub-assembly may be formed of various metallic materials, such as hot or cold rolled steel, aluminum and alloys thereof, copper compositions such as brass and bronze, and the like.

The nozzle proper of the exterior air supplying nozzle sub-assembly 25 consists of a pair of spaced, coaxially-arranged and cooperative inner or lower and outer or upper ring jaws 30 and 31. The inner or lower ring jaw 30 may have its major portion thereof in the form of a laterally flat washer-like or ring plate 32 provided on its inner edge with an upwardly-extending coaxial annular lip 33. The upper surface of the ring jaw section 32 preferably is shaped to provide a concave or frusto-conical flow face 34 which merges with an inwardly curved surface 35 of upwardly-extending annular lip 33 to guide smooth flow therealong from a radially inward direction to an axially outward direction.

The inner or lower nozzle ring jaw 30 is suitably supported upon the die ring structure 14 and, as is indicated in FIG. 5, may be made integral with the bottom wall or plate 28 of the hollow head 26. Since it may be desired to substitute one lower ring jaw for another for different setups, in which the upstanding lips 33 thereof are of different diameters so as to be located at different radial distances from the extruding orifice 12, this jaw and its plate section 32 may be made separately from the head plate element 28, to be separated therefrom on a circular junction line, such as that indicated at 36 in FIG. 5. In this case, the circular plate 19 which is mounted upon the die ring assembly 14 or its top ring section 21 may serve to support the inner edge of bottom head plate 28 and the adjacent plate section 32 of the lower nozzle ring jaw 30, and both may be fastened thereto in any suitable manner, such as by screws and the like (not shown). In any event, the junction between the die ring structure 14 and the nozzle ring jaw 30, as well as between the latter and the bottom head plate 28 should be substantially air-tight. since the pressure of the exterior air supply through the hollow head structure 26 and the nozzle proper 25 is relatively low, no gasketing is required for this purpose provided the abutting faces are closely fitted or minor leakage is accomodated by sufficient excess of supply.

The outer or top nozzle ring jaw 31 may be in the form of a substantially cylindrical sleeve preferably having its outer surface provided with male threads 37 threadably engaged with female threads 38 carried by the inner annular edge of the top head plate 27. Such threaded mount permits axial adjustment of the top nozzle ring jaw 31. The bottom edge of the top ring jaw 31 is shaped to provide a flow surface opposed to the concave flow surface 34 of the bottom ring jaw 30, and for this purpose may be chamfered on its outer side to define a frusto-conical convex annular surface 39 terminating on the inner side in a depending tapered lip 40 opposed to the concave surface 34 of the bottom nozzle ring jaw 30. The shape of the depending lip 40 of the adjustable top nozzle ring jaw 31 is not critical and it may, for example, be rounded off.

As will be seen from FIG. 3 the inside wall of the top nozzle ring jaw 31 is in the form of a cylindrical, coaxially extending sidewall 41. The annular mouth of the nozzle proper is defined between the upstanding annular lip 33 of the lower jaw 30 and this axially-extending cylindrical sidewall 41 of the top jaw 31, such as at the point 42 marked "x" in FIG. 3. Thus, the annular exterior air supplying nozzle defined by upper and lower jaws 31 and 30 has a portion of the former extending upwardly or outwardly above or beyond the nozzle mouth 42 so that issuing air will flow along this surface to develop a negative pressure in this area as will be explained hereinafter.

Since the head bottom plate 28 of the hollow head 26 is supported upon the die ring sub-assembly 14, such as by annular plate ring 19, the upper nozzle ring jaw 31 may be supported thereon in a simple manner by its threaded mount to the head top plate 27 and a plurality of tie bolts 43 and associated spacer sleeves 44 for support thereof by head bottom plate 28, as will be understood from FIG. 5.

In order to assure even distribution of flow of the exterior air supplied through the hollow head 26 to the annular nozzle 25 and its annular mouth 42 and to eliminate tendency to concentrate the flow in any particular paths, circular baffle means preferably is mounted in the hollow head to traverse the flow passage 29 therein. This baffle means may be provided in the form of one or more circular sleeves, such as 45 and 145, which may be of perforated metal or screen having relatively large holes 46 therein and substantially uniformly distributed thereover. Preferably the perforations occupy about fifty percent (50%) of the surface area of such a baffle sleeve. In order readily to locate the baffle sleeves 45 and 145 the bottom head plate 28 may be provided with circular grooves 47 and 147 in its top surface into which the bottom edges of these baffle sleeves are respectively nested, as will be seen from the right side of FIG. 5 and in FIG. 6. However, it is to be understood that such baffle means is not limited to the employment of any particular number of such perforated sleeves or the specific structure thereof. For example, effective baffling may be provided in the hollow head 26 by means of such sleeves which have their top edges spaced below the bottom face of the top head plate 27 to form partial flow choking spill-over weirs, or such top edges may be notched or castellated.

Exterior cooling air is supplied to the annular passage 29 of the hollow head 26 by means of an air supply manifold 50. As will be understood from FIGS. 1, 2, 5 and 6, the air supply manifold 50 may include laterally-extending top and bottom flat ring plates 51 and 52 suitably secured together in axially-spaced relation by a plurality of tie bolts 53 and associated spacer sleeve means 54, as well as by an annular sidewall sleeve 55 and a plurality of tie bolts 56 extending through longitudinal holes therein. Cooling air is supplied to the interior of the hollow annular manifold 50 by means of a plurality of ducts 57, as will be best understood from the right side of FIG. 5 and from FIG. 6. A plurality of flexible supply hoses 58 leading from a suitable air blower are connected to the ducts 57, and for this reason the manifold 50 may be permitted only limited rotary action. Accordingly, when the die 10, and the nozzle sub-assembly 25 and the air supply head 26 carried thereby, are given appreciable rotary oscillation or rotation it is necessary that the supply manifold 50 be permitted to remain substantially stationary. It is also desirable that the supply manifold 50 be supported through the hollow head 26 by the die and nozzle assembly. Accordingly, the supply manifold 50 is connected to the hollow supply head 26 by substantially air-tight joints which permit relative rotation, as will be explained hereinafter.

Preferably the supply manifold 50 is also provided with an annular baffle sleeve 245 having substantially uniformly distributed passage holes 46, and it has been found to be advantageous to provide a lateral washer-like baffle ring 59 in the manifold chamber 60 which extends between the outer sidewall 55 and the perforated baffle sleeve 245. For this purpose, the spacer sleeve means 54 are each made in half sections so that opposed ends thereof will be clamped to opposite sides of the annular baffle ring 59 when the tie bolts 53 are extended therethrough, as will be understood from the left side of FIG. 5. The annular baffle plate 59 is also provided with suitable passage holes 146 substantially uniformly distributed therein. The annular baffle ring 59 has been omitted from FIG. 6 in order to avoid confusion in the showing.

In order to support in a simple manner the relatively non-rotary air supply manifold 50 upon the rotary supply head 26 by bearing-equipped joints which prevent leakage thereat in any appreciable amounts the top and bottom head plates 27 and 28 has circumferential marginal zones 65 and 66 thereof that define a pair of axially-spaced annular flanges. These annular flanges 65 and 66 respectively have upwardly-facing support faces 67 and 68 with the resulting pair of top and bottom support faces being rotatable with the die and nozzle. As will be understood from FIGS. 5 and 6, the top surface of the upper head plate 27 constitutes the support face 67 thereof while the lower head plate 28 may be rabbeted to provide the support face 68 in the form of an annular step or shoulder. The air supply annular manifold 50 has a pair of axially-spaced, lateral top and bottom annular flanges 69 and 70 extending radially inward from the inner side thereof with the manifold chamber 60 communicated anularly to the space between these flanges. The manifold flanges 69 and 70 include inner edge zones which respectively have downwardly-facing faces 71 and 72 serving as a pair of top and bottom supporting faces respectively lapped over the top and bottom support faces 67 and 68 of the head flanges 65 and 66, thereby providing with the latter top and bottom pairs of opposed and lapped flange faces to provide rotary joints. Preferably the lower supporting face 72 of the manifold bottom flange 70 is also defined by rabbeting the edge thereof to provide it as a downwardly-facing annular step or shoulder, so that this manifold bottom flange may be substantially aligned with the bottom head flange 66 for no particular critical purpose.

The pair of rotary joints provided by the top and bottom pairs of opposed and lapped flange faces 67 and 71, and 68 and 72 are each equipped with a circular bearing ring of certain cross-sectional shape. Circular bearing ring 73 may have a rectangular cross-sectional shape, as is illustrated in FIGS. 5 and 6, and it is interposed between the lapped flange faces 67 and 71. As is indicated in FIG. 6 the upper flange face 67 is provided with a depressed circular track or annular groove 74 in which bearing ring 73 is seated or nested in a substantially airtight manner. For this purpose, the bearing ring 73 may have a press fit in the circular nesting channel 74, or it may be anchored therein by brazing or similar means. For this purpose the top head flange 65 may be of any suitable metallic composition, such as steel, brass, bronze, etc., and the bearing ring 73 may be of a relatively hard copper compound, such as brass or bronze. Preferably the circular bearing ring 73 is of brass so as readily to be wear-lapped to a circular track of the opposed face 71. The latter is likewise provided with a depressed circular track or annular channel 75 of a transverse shape complementary to the transverse shape of the adjacent portion of this bearing ring 73, and with the latter nested therein for rotary slide while maintaining a substantially air-tight seal thereat. The manifold flange 69 also may be formed of any suitable metallic composition, such as steel, brass, bronze, or the like for this purpose. It is to be understood that since the bearing ring 73 may be brazed to the head flange 65 to attain the airtight joint thereat this bearing ring may be seated flat upon the top face 67 without the employment of the nesting channel 74. Also, the parts may be reversed with the bearing ring 73 fixedly carried by the bottom face 71 of the manifold flange 69 and having its bottom portion slidably nested in the annular channel 74. With careful fitting of the bearing ring 73 in the opposed channels 74 and 75 so as to attain substantially air-tight junctions while permitting relatively sliding action it is also possible to omit fixation of this bearing ring to either the head flange 65 or the manifold flange 69, but fixation of the bearing ring to one of these flanges is preferred so as to eliminate some of the otherwise necessary careful fitting or machining.

As will also be understood from FIG. 6, lower bearing ring 76 may be of a construction similar to bearing ring 73 and interposed between lapped flange faces 68 and 72 in a similar manner. Thus, bearing ring 76 may be fixedly nested in depressed circular track or annular channel 77 in the lower head flange 66 and press fitted or brazed therein. The top portion of the lower bearing ring 76 is slidably nested in an opposed depressed circular track or annular channel 78 in supporting face 72 of the manifold flange 70 for rotary slide therein. Since the rotary joints at the top bearing ring 73 and at the lower bearing ring 76 are similar the features and permissive characteristics indicated above with respect to the mount of the bearing ring 73 may be employed in the mount of the lower bearing ring 76.

It will be noted from FIGS. 5 and 6 that the outer diameter of the lower head flange 66 is appreciably greater than that of the upper head flange 65, and that the inner diameter of the lower manifold flange 70 is appreciably greater than that of the upper manifold flange 69. This is for the purpose of providing the lower manifold flange 70 with an inner diameter greater than the outer diameter of the upper head flange 65, so that the former may pass the latter when the hollow head 26 and the manifold 50 are moved axially relative to each other. These relative dimensions of parts of the head 26 and the manifold 50 permit the latter to be mounted on the former by moving it axially down from the freed dot-dash position indicated at 80 in FIG. 6 to the full line mounted position shown therein for rotary support upon the head 26.

As is illustrated in FIG. 7 the bearing ring sub-assemblies by which the relatively non-rotary air supply manifold 50 is connected to the hollow air supply head 26 may employ bearing rings of a cross-sectional shape differing from the rectangular cross-sectional shape of bearing rings 73 and 76 illustrated in FIGS. 5 and 6. These upper and lower bearing rings 173 and 176 may be circular in cross-section, as is therein indicated, each nested in complementary annular channels or tracks which are arcuately curved transversely, as is illustrated at 174, 175, 177 and 178. The annular channels 174 and 177 in the head flanges 165 and 166 of the upper and lower head plates 127 and 128 may have the bearing rings 173 and 176 fixed therein by brazing. The opposed annular depressed tracks 175 and 178 in the manifold flanges 169 and 170 preferably will also be transversely described on circular arcs for snug sliding fit to the upper curved portions of the bearing rings 173 and 176 nested therein. It should be obvious that various other cross-sectional shapes for the upper and lower bearing rings may be employed, such as oval, diamond-shaped, triangular, etc., to attain the same desired ends.

In use and operation of such a die assembly of the present invention let it be assumed that the die ring sub-assembly 14 is suitably equipped to apply relatively slow oscillation or roatation to the die 10, such as at a speed of about one-eighth revolution per minute (⅛ rev./min.). For this purpose the die ring may be equipped with a suitable gear or sprocket ring, indicated at 81 in FIG. 5, for drive thereof from a suitable speed reducer and associated electric motor. To start a production run plastic melt will be supplied through feed duct 17 to the annular extruding passage 18 intervening the die core 13 and the die ring means 14 to the annular extruding orifice 12. As the plastic tubing initially is extruded from the annular die orifice 12 it will be squeezed closed and led up through to the flattening roller equipment for ultimate pinch off thereat. A quantity of interior air will be fed through the interior air supply duct 15 so as to balloon out the extruded plastic tubing 82 (FIGS. 2 and 3), and thereafter this quantity of interior air which is trapped within the extruded tubing below the flattening roller equipment will effect the required progressive ballooning. The pressure of the interior air trapped within the extruded tubing 82 below the roller flattening equipment effects the required stretching to the desired diameter and the attendant reorientation of the crystalline structure for stabilization and resulting strengthening before the hot soft extruded tubing becomes sufficiently chilled to set it. The chilling is attained by the exterior cooling air supplied through the annular air ring nozzle sub-assembly 25, and it may occur, for example, at about the point 83 indicated in FIG. 2, which will be apparent to the operator by change in appearance thereat from a sparkling and crystal clarity to a slightly cloudy or frosty appearance, and is thus called in the art the "frost line."

When exterior cooling air equipment of the prior art is employed to attain such diametric ballooning or expansion to the ultimate desired diameter the increase of diameter may be gradually progressive, such as that indicated in dot-dash lines 84 in FIG. 3. However, in accordance with operation of equipment of the present invention this diametric stretching and ballooning is attained more immediately adjacent the extrusion orifice 12.

As will be seen from FIG. 3 the exterior cooling air as it is emitted from the mouth 42 of the air ring nozzle 25 flows longitudinally outward along the outer surface of the extruded plastic tubing 82 in the annular space between the external surface of this extruded tubing and the vertical inside wall 41 of the upper air ring jaw 31. Since the annular space intervening the exterior surface of the extruded tubing or tubular plastic film 82 and a surrounding annular surface of the air ring nozzle 25 or, more particularly, the vertical inside wall 41 of the upper jaw 31 thereof, is closed or sealed off at the bottom between the extruding orifice 12 and the lower air ring jaw 30 (except for the annular nozzle mouth 42 through which exterior cooling air is fed) partial evacuation is created in this intervening space by the outflowing air. Consequently, a pressure differential between the pressure exerted on the inside of the extruded tubing or tubular plastic film 82 by the interior air trapped therein and the reduced pressure in this intervening space is developed to cause the soft hot wall of the extruded tubing to pop out into a balloon or belling shape immediately above the nozzle mouth 42 in the area 85 within this space (FIG. 3). This belling at 85 reduces the width of this intervening space at its mouth marked "x" at 86 in FIG. 3 to develop a Venturi effect which enormously increases the velocity of the outflow of cooling exterior air and its travel along the exterior surface of the extruded hot tubing rapidly to carry away the heat thereof. Also, this belling stretches the sidewalls of the extruded tubing 82 within the air ring nozzle 25 to effect there the strengthening stabilization with attendant thinning of the tubing walls which, together with the increased velocity of the cooling air, greatly speeds the cooling effect. Thus, the stabilizing stretching which thins the tubing walls and the speedier chilling of the thinned walls of the extruded tubing or tubular plastic film 82 to a set condition are effected much nearer to the extruding orifice 12, i.e., the tubular plastic film is ballooned and the frost line of chilling is developed much sooner. As a result, the rate of production of the tubular plastic film is desirably speeded appreciably.

Initial velocity of the exterior cooling air flow through the air ring nozzle mouth 42, with the rate of the flow of air supplied to the air ring nozzle being maintained constant, is dependent upon the width of the nozzle throat between the depending lip 40 and the flow surface 34. This velocity may thus be adjusted by vertical or axial screw translation of the upper air ring jaw 31.

The radial distance between the die orifice 12 and the inner side of the annular lip 33 of the lower air ring jaw 30 is not critical and in practice it may be varied in a range from about one-fourth of an inch to about three-quarters of an inch (¼"–¾"). Likewise, the width of the annular gap between the lower jaw lip 33 and the vertical inner sidewall 41 of the upper jaw, intervening the nozzle throat at 40 and the nozzle mouth at 42 may also be varied, such as within a range of about three-eights of an inch to three-quarters of an inch (⅜"–¾"). These two dimensions are variable according to the blow-up ratio and the thickness of the walls of the tubular plastic film desired. If the blow-up ratio is identified as "BR," the diameter of the extruding orifice 12 is identified as "DD" and the bubble diameter of the tubular film belling or ballooning at 85 is identified as "BD," the blow-up ratio may be expressed by the following formula:

$$BR = BD/DD$$

It is of no moment that an angular recess exists between the top end of the die ring means 14 and the inner cylindrical side of the lip 33 of the lower air ring jaw 30, shown in FIG. 3. In fact this recess may be filled in, such as by reducing the diameter of the lower portion of this air ring jaw 30 and curving the annular sidewall thereof up to mergence with the top edge of the lip 33, as is indicated in dotted lines at 87 in FIG. 3. In doing so, the only critcical factor which need be recognized is that this curved surface extending upwardly from the near vicinity of the die orifice 12 should not be so located as to be touched by the soft exterior of the traveling hot tubular plastic film as it is extruded upwardly and progressively swelled radially outward due to the ballooning or belling in the area 85 thereabove.

The dimensional, die rotation or oscillations, pressure and flow rate requirements for any particular setup to attain a particular production of extruded plastic tubing or tubular plastic film with the use of equipment herein described are largely determined empirically. Change of one or more factors has influence on many of the others. The extruded plastic tubings may be required with wall thicknesses in the range of about one-half to twenty (0.5–20) mils (i.e., 0.0005"–0.020"), the greatest demand being for a wall thickness of about one and a half (1.5) mils (or 0.0015"). Let it be assumed that an order requires production of conventional polyethylene tubing of a sp. gr. of ±0.9 having a wall thickness of one and a half (1.5) mils and a circumference of thirty-nine inches (39"), to be flattened into a bag stock ribbon nineteen and one-half inches (19.5") wide. An extrusion die 10 having an extruding orifice 12 eight inches in diameter (8" dia.) and twenty (20) mils (0.020") in width may be selected and connected to a two and one-half inch (2.5") extruder which feeds the polyethylene melt thereto through a two and one-half inch (2.5") feed duct 17 to provide a rate of flow through the die of one hundred and twenty-six pounds per hour (126#/hr.) at an extrusion pressure of about fifty-five hundred pounds per square inch (5500# p.s.i.). This extrusion die 10 may be equipped with an air ring subassembly 25 of the present invention in which the radial distance between the extruding orifice 12 and the lip 33 of the lower air ring jaw 30 is five-eighths of an inch (⅝") and the radial distance between this die orifice and the vertical inner sidewall 41 of the upper air ring jaw 31 is one and one-eighth inches (1⅛"). The annular gap in the air ring between the depending lip 40 of the upper air ring jaw and the curved top surface 34 of the lower air ring jaw 30, i.e., the width of the throat thereof, may be adjusted to about three-sixteenths of an inch (3/16"). The supply of exterior cooling air to the air ring sub-assembly 25 may be provided by a blower equipped with a one horsepower (1 H.P.) electric motor and having a manual intake volume control to deliver four hundred to five hundred cubic feet per minute (400–500 c.f.m.) at a pressure of an eight inch (8") water column. The blower outlet may be five inches in diameter (5" dia.) and connected by a distribution manifold and four flexible hoses 58 to the air supply manifold 50 through the four supply ducts 57 of the latter with each supply duct being two inches in diameter (2" dia.).

In carrying out a production run of the tubular plastic film by the die assembly characterized by the dimensions and the ratings of the associated air supply equipment and flow rates indicated immediately above to produce the extruded polyethylene tubing of a circumferential dimension of thirty-nine inches (39") with a wall thickness of one and one-half (1.5) mils or (0.0015"), the approximate diameter of the bubble developed in the area 85 will be about nine and one-half inches (9½") in diameter, and the lateral spacing between this bubble and the vertical inside wall 41 of the top air ring jaw 31 will be about three-eighths of an inch (⅜").

In an effort to determine what conditions cause this ballooning or belling effect in the area 85 a Dwyer #460 air meter equipped with a Pitot tube was employed in the manner illustrated in FIG. 4. The Pitot tube 88 of this air meter was located first in the full line position indicated therein to measure the pressure and velocity of the air flow emitting from the nozzle mouth 42, which gave a reading of positive pressure of one inch (1") of water and a velocity of four thousand feet per minute (4000 f.p.m.). When the Pitot tube was located in the dotted line position 188 a negative pressure reading of five one-hundredths to nine one-hundredths of an inch (0.05" to 0.09") of water was obtained. When the Pitot tube was located in the dot-dash line position 288, a negative pressure reading of two one-hundredths to twenty-five one thousandths of an inch (0.02"–0.025") of water was obtained. This showed evacuation in the closed off space between the exterior sidewalls of the hot extruded tubular plastic film 82 and the vertical annular inner sidewall 41 of the air ring nozzle jaw 31 which produced the differential in pressure on the opposite sides of the plastic film sidewalls due to the internal pressure of the air bubble trapped interiorly, to cause the belling effect at 85 within the exterior cooling air supply nozzle 25.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a die assembly for extruding continuous plastic tubing from thermoplastic melt the combination with
   (a) a die having a delivery end provided with an annular extruding orifice defined between substantially coaxially arranged core means and surrounding die ring structure, said die having means to rotate it about its axis and means laterally inward of the annular orifice for supplying air interiorly of plastic tubing extruded from the latter; and
   (b) an annular, exterior air supplying ring nozzle arranged coaxially about and appreciably spaced radially outward of said annular orifice comprising a pair of spaced, coaxially arranged and cooperative inner and outer ring jaws having opposed and spaced-apart annular air flow guiding surfaces together defining therebetween an annular delivery mouth and shaped to direct an annular flow of cooling air against the outer surface of plastic tubing extruded from the orifice; of
   (c) an annular hollow head fixed to said air ring nozzle having its interior communicated annularly to the annular nozzle delivery mouth with its laterally outer annular side being open and defined between a pair of axially-spaced annular flanges fixed to said head and extending laterally outward therefrom,
   (d) cooling air feed means in the form of an air supplying annular manifold laterally surrounding said head and open on its laterally inner annular side between a pair of axially-spaced annular flanges fixed to said manifold and extending laterally therefrom,
   (e) said manifold flanges having inner edge zones lapped over and above outer edge zones of said head flanges for support of said manifold on said head by the resulting two pairs of lapped flanges with lateral faces of each pair being opposed, and
   (f) a pair of circular bearing rings of certain cross-sectional shape arranged concentrically about said nozzle with each bearing ring carried by one of said opposing faces of one of said pair of lapped flanges and nested for slidable riding action in a circular track in the other opposing face of this pair of lapped flanges, the transverse shape of the track being complementary to the transverse shape of the portion of said bearing ring nested therein to form substantially air-tight seals between the two pairs of lapped flanges, the resulting pair of sealed bearings permitting said air ring nozzle and its air supply head to rotate with said die relative to said manifold.

2. In a die assembly for extruding continuous plastic tubing from thermoplastic melt the combination with a die having a delivery end provided with an annular extruding orifice defined between substantially coaxially arranged core mans and surrounding die ring structure, said die having means to rotate it about its axis and means laterally inward of the annular extruding orifice for supplying air interiorly of plastic tubing extruded therefrom; of
   (a) an annular, exterior air supplying ring nozzle arranged coaxially about the annular orifice and carried by said die for rotation therewith with said air ring comprising a pair of spaced, coaxially arranged and cooperative inner and outer ring jaws having opposed and spaced-apart annular flow guiding surfaces together defining therebetween an annular delivery mouth for directing flow of cooling air against the outer surface of plastic tubing extruded from the extruding orifice,
   (b) a pair of opposed and axially-spaced, lateral top and bottom circumambient walls extending radially outward from said air nozzle ring jaws and connected respectively to the latter in substantially air-tight manner defining an annular hollow head having its interior communicated annularly to the annular nozzle delivery mouth,
   (c) said top and bottom head walls terminating on their radially outer edges in a pair of axially-spaced top and bottom lateral flanges with an annular air flow passage to the annular nozzle mouth provided therebetween,
   (d) an air supplying annular manifold surrounding said head having a pair of axially-spaced, lateral top and bottom annular supporting flanges extending radially inward from the inner side thereof with the space therebetween communicated to the interior of said manifold,
   (e) said manifold flanges having inner edge zones with bottom faces thereof lapped over outer edge zones of top faces of said head flanges to define two pairs of axially-spaced and opposed lapped flanges for support of said manifold by said head, and
   (f) a pair of circular bearing rings of certain cross-sectional shape arranged concentrically about said nozzle with one mounted between the lapped bottom head and manifold flanges and the other mounted between the lapped top head and manifold flanges, each ring being carried by the opposing face of one of the flanges of one of the lapped pairs with the opposing face to the other flange of this lapped pair having a circular track therein of a transverse shape complementary to the transverse shape of the adjacent portion of said bearing ring and with the latter nested for rotary slide in said track, said pair of bearing rings and their mountings providing substantially air-tight rotary joints between said pairs of lapped flanges.

3. The combined extruding die and air ring nozzle assembly as defined in claim 2 in which each bearing ring is formed of a relatively hard copper alloy and is rectangular in cross-section, said flange to which said ring is fixed is of metallic composition and brazing fixes said ring to this flange.

4. The combined extruding die and air ring nozzle assembly as defined in claim 2 in which at least a pair of annular baffle sleeves, each of a construction providing annular cooling air flow therepast with substantially uniform annular distribution mounted intermediate an air supply inlet to said annular manifold and said ring nozzle, one of said baffle sleeves being mounted in said hollow head between the lateral top and bottom circumambient walls thereof and the other of said baffle sleeves being mounted radially outward of said first-mentioned baffle sleeve in said annular manifold between said lateral top and bottom flanges thereof.

5. In an assembly of a rotary die for extruding plastic tubing and exterior cooling air supply ring nozzle means fixedly mounted on said die coaxially about and radially outward of the extrusion die orifice, the combination comprising (a) a pair of annular, coaxially arranged and cooperative top and bottom nozzle ring jaws together defining therebetween an annular delivery mouth for delivery of cooling air to plastic tubing as it is extruded from the die orifice, (b) a pair of axially-spaced, laterally flat, annular, washer-like plate means coaxially arranged about said nozzle ring jaws with each of the latter connected to one of the former in a substantially air-tight manner for annular supply of cooling air between said pair of washer-like means to the delivery mouth, (c) each of said washer-like means having a circumferential marginal zone defining an annular flange having an upwardly-facing support face with the resulting pair of top and bottom support faces being rotatable with the die and nozzle, (d) a relatively non-rotary air supplying annular manifold coaxially surrounding said die, nozzle, washer-like means and the marginal support faces of the latter and having a pair of axially-spaced, lateral top and bottom annular flanges extending radially inward from the inner side thereof with the interior of said manifold communicated annularly to the space between these flanges, (e) said manifold flanges including inner edge zones having downwardly-facing faces serving as a pair of top and bottom supported faces respectively lapped over said top and bottom suport faces and providing with the latter top and bottom pairs of opposed and lapped flange faces, and (f) a pair of circular bearing rings of certain cross-sectional shape arranged concentrically about said nozzle means with one thereof interposed between the pair of top lapped flange faces and the other mounted between the pair of bottom lapped flange faces, each bearing ring being carried in a substantially air-tight manner by one of the pair of lapped flange faces between which it is interposed with the other of the latter having a depressed circular track therein of a transverse shape complementary to the transverse shape of the adjacent portion of said bearing ring and with the latter nested in this track for rotary slide therein while maintaining a substantially air-tight seal thereat.

6. The air ring nozzle air supply structure as defined in claim 5 in which the internal diameter of said bottom lateral manifold flange is greater than the outer diameter of said top washer-like plate means whereby said manifold may be lifted free from said pair of washer-like plate means and conversely lowered to seat thereon for support thereby.

7. The air ring nozzle air supply structure as defined in claim 6 in which each of said bearing rings is circular in cross-section.

8. The air ring nozzle air supply structure as defined in claim 6 in which each of said bearing rings is rectangular in cross-section.

9. The air ring nozzle air supply structure as defined in claim 8 characterized by each of said flange faces which carries one of said bearing rings in an air-tight manner in opposition to the slide track in the flange paired therewith also being provided with a similar depressed circular track in which said ring is nested.

10. In a die assembly for extruding continuous plastic tubing from thermoplastic melt the combination with (a) a die having an extrusion end provided with an annular extruding orifice defined between substantially coaxially arranged core means and surrounding die ring structure, said die having means laterally inward of the annular orifice for supplying air interiorly of plastic tubing extruded from the latter; and (b) an annular, exterior air supplying ring nozzle sub-assembly arranged coaxially about and appreciably spaced radially outward of said annular orifice comprising spaced and coaxially arranged cooperative ring jaw means having opposed and spaced-apart annular air flow guiding faces and inward terminal lips defining therebetween an annular air flow passage terminating in a delivery mouth of greater annular diameter than said annular die orifice to direct cooling air against the exterior of plastic tubing extruded through this die orifice; of (c) cooling air supply means in the form of an annular hollow head interiorly communicated annularly to the annular nozzle flow passage and with its laterally outer side being open and defined between a pair of axially-spaced annular flanges extending laterally outward therefrom;

(d) cooling air feed means in the form of an annular manifold laterally surrounding said head and open on its laterally inner annular side between a pair of axially-spaced annular flanges extending laterally inward therefrom with inner edge zones of the latter flanges lapped against outer edge zones of said head flanges for support of one of said manifold and head on the other by the resulting two pairs of lapped flanges with faces of each pair opposed; and (e) a pair of circular bearing rings of certain cross-sectional shape arranged concentrically about said nozzle with each bearing ring carried by one of said opposing faces of one of said pair of lapped flanges and nested for slidable riding action in a circular track in the other opposing face of this pair of lapped flanges, the transverse shape of the track being complementary to the transverse shape of the portion of said bearing ring nested therein to form substantially air-tight seals between the two pairs of lapped flanges, the resulting pair of sealed bearings permitting relative rotation of said manifold and head.

References Cited by the Examiner

UNITED STATES PATENTS

| | | | |
|---|---|---|---|
| 2,632,206 | 3/53 | Pierce | 264—95 |
| 2,770,009 | 11/56 | Rogal et al. | 18—14 |
| 2,926,384 | 3/60 | Hertz et al. | 18—14 |
| 2,947,031 | 8/60 | Ho Chow et al. | 18—14 |
| 2,952,874 | 9/60 | Doyle | 18—14 |
| 3,020,588 | 2/62 | Ferguson et al. | 18—14 |
| 3,061,876 | 11/62 | Lloyd et al. | |
| 3,064,905 | 11/62 | Bonner. | |
| 3,167,814 | 2/65 | Corbett | 18—14 |

FOREIGN PATENTS 805,858  12/58  Great Britain.

J. SPENCER OVERHOLSER, *Primary Examiner.*

MICHAEL V. BRINDISI, WILLIAM J. STEPHENSON, *Examiners.*